United States Patent

Ungermann et al.

[11] Patent Number: 6,053,775
[45] Date of Patent: Apr. 25, 2000

[54] CHIP CARD CONTACTING UNIT

[75] Inventors: Heinz Ungermann, Linsengericht; Arnd Bäcker, Hellenthal; Dieter Klatt, Wulfrath, all of Germany

[73] Assignee: Stocko Metallwarenfabriken Henkels und Sohn GmbH & Co., Germany

[21] Appl. No.: 09/178,338

[22] Filed: Oct. 22, 1998

[30] Foreign Application Priority Data

Oct. 22, 1997 [DE] Germany ................. 297 18 773.2

[51] Int. Cl.[7] .................................................. H01R 24/00
[52] U.S. Cl. .................. 439/630; 439/188; 439/76.1; 235/441; 235/492
[58] Field of Search .............................. 439/630, 489, 439/188, 260, 60, 76.1; 235/482, 483, 475, 441, 492

[56] References Cited

U.S. PATENT DOCUMENTS

| 5,334,034 | 8/1994 | Reichardt et al. | 439/188 |
| 5,334,827 | 8/1994 | Bleier et al. | 439/188 |
| 5,729,000 | 3/1998 | Sugimoto | 235/441 |
| 5,775,949 | 7/1998 | Bricaud et al. | 439/630 |
| 5,898,159 | 4/1999 | Huang | 235/441 |
| 5,901,049 | 5/1999 | Schmidt et al. | 235/441 |
| 5,912,446 | 6/1999 | Wong et al. | 235/482 |
| 5,924,881 | 7/1999 | Yasushi et al. | 439/188 |
| 5,926,365 | 7/1999 | Roelofs et al. | 439/630 |

FOREIGN PATENT DOCUMENTS

| 0414390 | 2/1991 | European Pat. Off. . |
| 0704813 | 4/1996 | European Pat. Off. . |
| WO9533243 | 12/1995 | WIPO . |

*Primary Examiner*—Paula Bradley
*Assistant Examiner*—Tho D. Ta
*Attorney, Agent, or Firm*—Robert W. Becker & Associates

[57] ABSTRACT

A chip card contacting unit has a housing and a printed circuit board mounted in the housing. The printed circuit board has contacts for contacting electrically and mechanically a contact array of a chip card received in the housing. A switch is mounted in the housing. The switch has a stop limiting insertion of the chip card into the housing. A guide member guides the chip card during insertion and acts on the side of the chip card opposite the contact array to ensure correct positioning of the contact array at the contacts by providing an abutment.

8 Claims, 2 Drawing Sheets

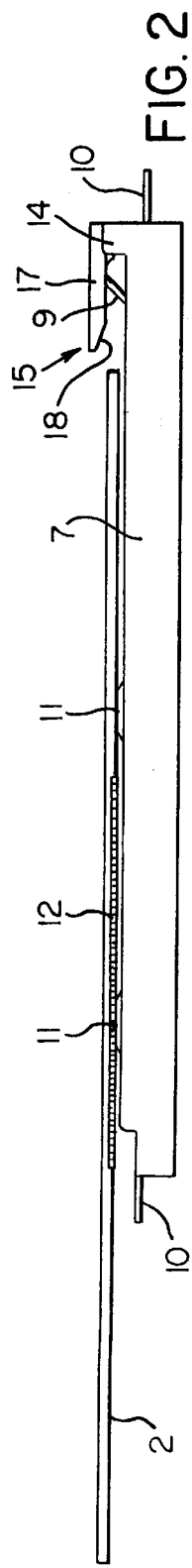
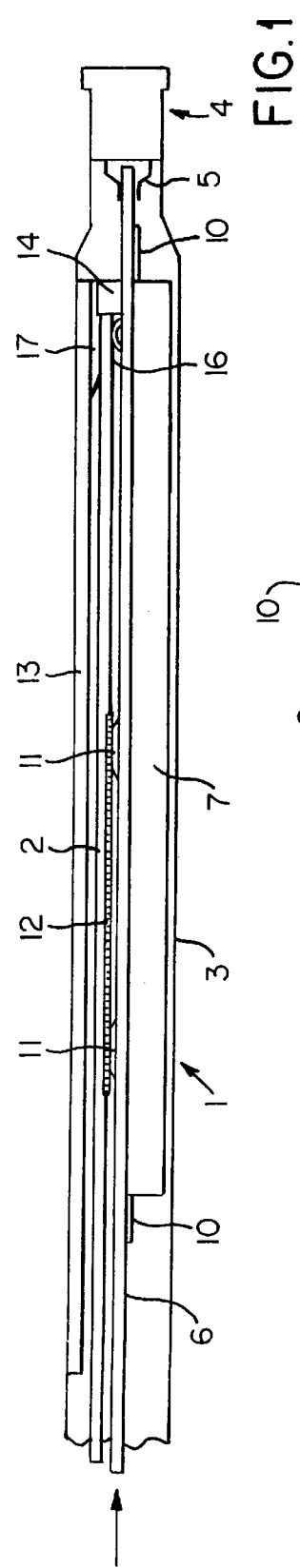
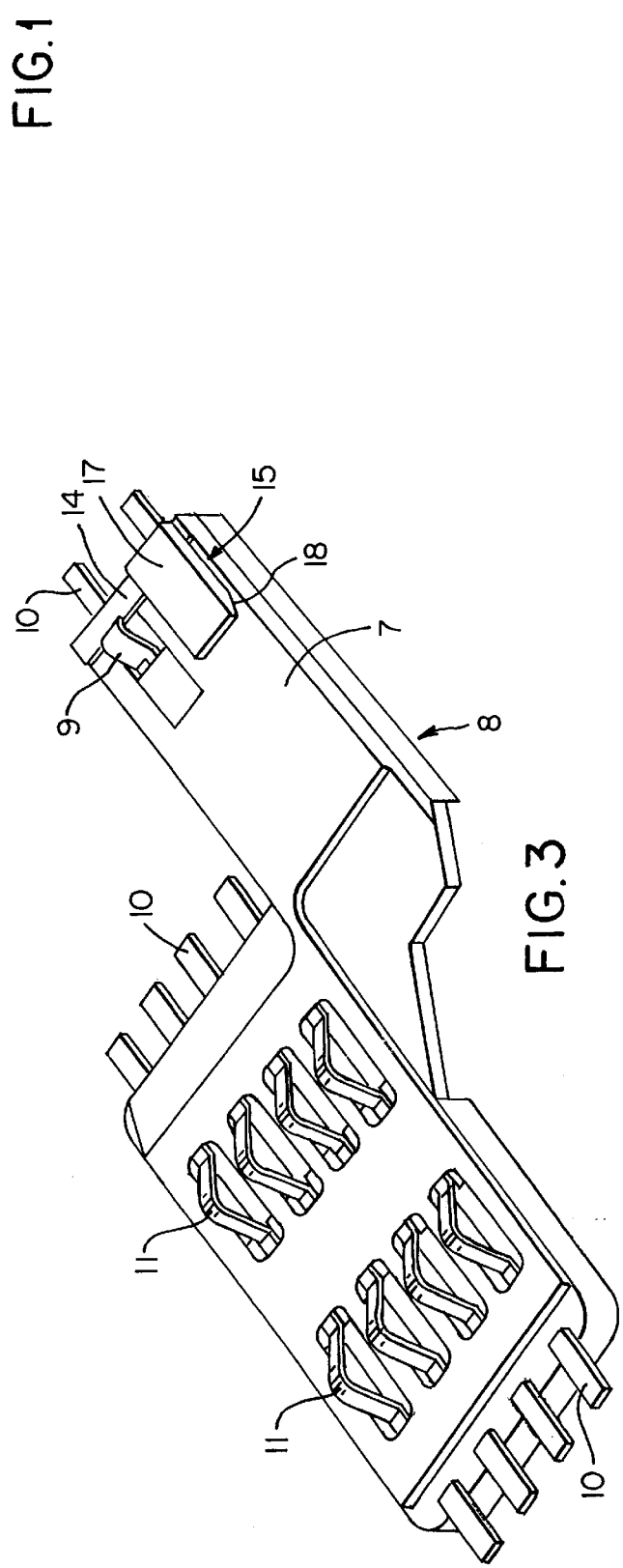

CHIP CARD CONTACTING UNIT

BACKGROUND OF THE INVENTION

The invention relates to a chip card contacting unit in which the contact array of the chip card is electrically and mechanically contacted by the contacts of the printed circuit board of the contacting unit whereby for ensuring the correct contacting position of the chip card relative to the contacts a switch with an axial stop is provided that limits the axial insertion movement of the chip card.

Such chip card contacting units are known from International Patent Application WO 95/33243. Such contacting units are, for example, used in the form of reading devices in banking, for pay TV as well as an access authorization for data networks, personal computers, etc. For mobile chip card readers and also for mobile telephones in connection with SIM cards a very precise switching function is required due to the miniaturized design because the tolerances relative to one another (housing, printed circuit board, and contacts) considerably effect the switching function and switching reliability. For ensuring the correct contacting position and function of chip card and contacting unit relative to one another, a switch is provided which essentially detects the presence of a chip card in the chip card contacting unit whereby the leading transverse edge of the chip card actuates a means for switching the control, such as a switch spring or a switch lever, so that only after this cooperation a signal transfer from the printed circuit board to the chip card and vice versa is possible. The switch thus informs the chip card contacting unit that a chip card has been inserted and the correct contacting position has been reached so that thereafter data transfer is possible.

A disadvantage of such chip card contacting units is that the inserted chip card is not precisely enough guided by the axial stop that limits its insertion and that it is not automatically forced into a correct switching position. There is always the risk that the chip card is outside the switching hysteresis in the inserted position and that a data transfer is not possible. When unfavorable positioning tolerances are present, for example, of the circuit board relative to the housing, insertion of the chip card past the stop can occur so that the contact array of the chip card is lifted off the contact springs provided at the printed circuit board and switching errors can occur. Also, vibrations and impacts may result in an accidental displacement of the chip card from its contacting position.

It is therefore an object of the present invention to improve a chip card reader of the aforementioned kind while avoiding the aforementioned disadvantages with respect to functional reliability and to increase the contacting reliability for positioning of the chip card in the contacting device.

SUMMARY OF THE INVENTION

The object is inventively solved in that the guide member provided in addition to the axial stop for the chip card guides the chip card, during insertion into the contacting position, in the manner of an abutment acting at a side of the chip card opposite the contact array. This guide member thus prevents any lifting of the chip card away from the contacting position and from the switch, and a displacement of the chip card in the upward direction is prevented which is especially important in embodiments where the contacts of the printed circuit board are embodied as contact springs that, due to their spring force, provide a spring action in the vertical upward direction onto the inserted chip card.

Preferably, the guide member is a holding down member acting on the chip card on a side which is positioned opposite the contact array of the chip card. Expediently, the holding down member is connected to the axial stop and is embodied so as to project across the leading transverse edge of the chip card. Preferably, the guide member is embodied as a flat member. It is possible to embody the plastic member on which the switch and the contacts are supported together with the axial stop and the guide member as a unitary or integral plastic part. This is advantageous in that such a part can be manufactured in a simple and inexpensive manner.

According to a preferred embodiment of the invention, the guide member is provided with an insertion slant for receiving the leading edge of the inserted chip card. This design can improve the clamping function provided by the guide member in that the guide member is in the form of an elastic spring made of plastic or metal. The guide member thus provides an active clamping function for the chip card that prevents accidental release of the chip card from the contacting position, for example, caused by vibration or impact.

In order to ensure a simple placement of the additional guide member within the housing of the chip card reader which, especially for mobile designs, provides only minimal space, without enlarging the vertical dimensions of the chip card contacting unit, according to a preferred embodiment of the invention it is suggested that in the adjacent housing plate, for example, the housing bottom, or within a reinforcement plate provided thereat, a cutout or window is provided that receives the guide member completely or partially.

Preferably, the inventive chip card contacting unit is used in connection with PCMCIA chip card readers because extreme tolerance problems due to standardization of the dimensions are present. For example, the use of lateral guide means for the chip card to be inserted is not possible, whereby, with respect to the mobile use of such devices, specifications with respect to safe and reliable contacting are even more stringent.

In summarizing the above, the inventive guide member provides that in the area of the switch the contacting reliability is considerably improved because the external system and device tolerances no longer have an effect on the functional reliability of the chip card contacting unit (contacting unit-internal safety function) so that the chip card is sufficiently secured against loosening caused by vibration and impact whereby the abutment or holding down function also relieves the soldered connections of the switch and allows testing of the module in the open state before closing the housing with respect to electrical and mechanical functions. This results in a considerable cost saving during mounting and also reduces the number of rejects.

BRIEF DESCRIPTION OF THE DRAWINGS

The object and advantages of the present invention will appear more clearly from the following specification in conjunction with the accompanying drawings, in which:

FIG. 1 shows a PCMCIA chip card contacting unit in a side view whereby housing parts have been eliminated in order to more clearly show the construction and design of the interior;

FIG. 2 shows a side view of the switch;

FIG. 3 shows the switch in a perspective view;

DESCRIPTION OF PREFERRED EMBODIMENTS

Figure 4:
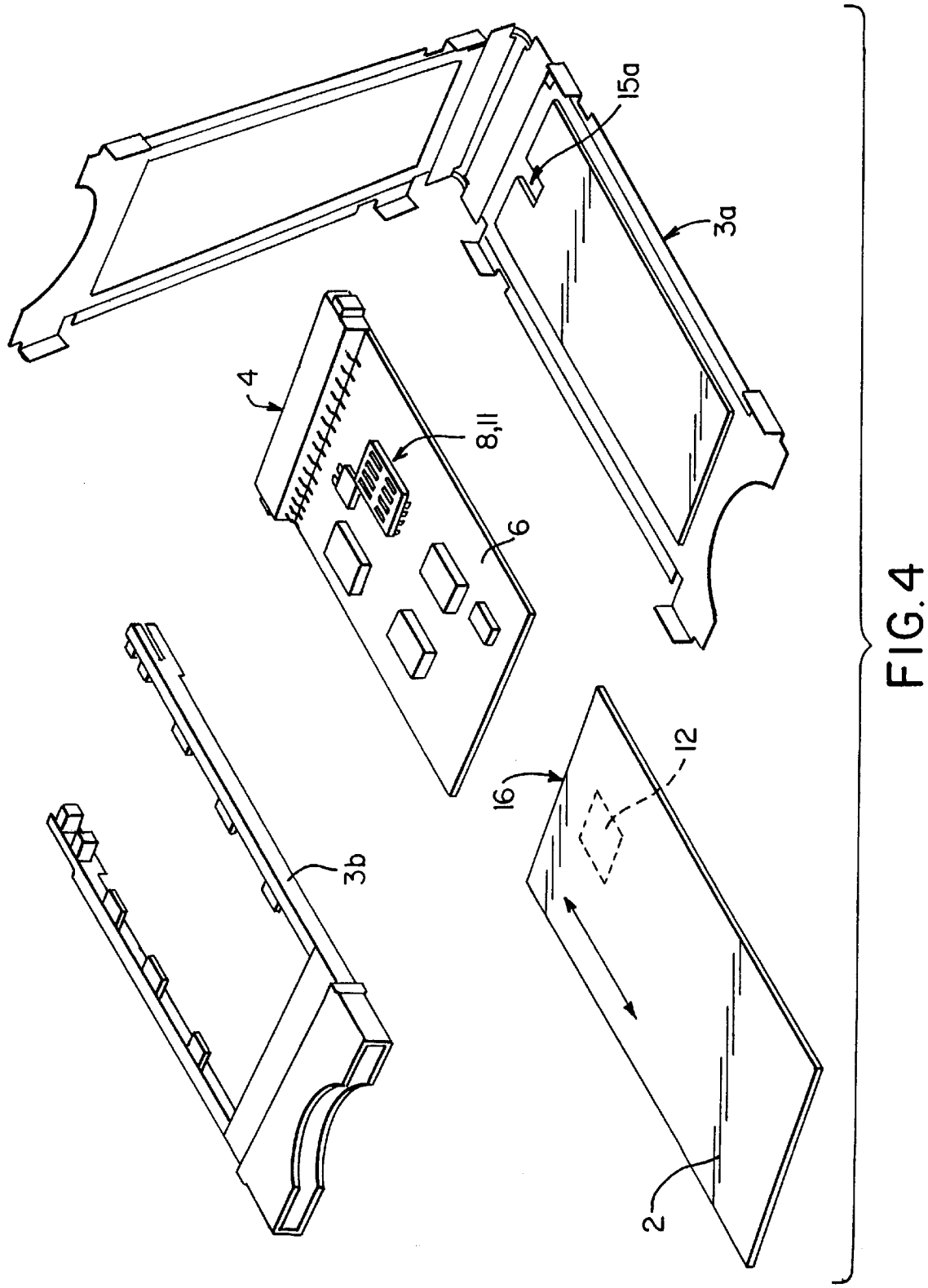
FIG. 4 shows an exploded view of housing, printed circuit board with guide facing downwardly, and chip card to be inserted underneath the circuit board.

The present invention will now be described in detail with the aid of several specific embodiments utilizing FIGS. 1 though 3.

The PCMCIA chip card contacting unit 1 shown in FIG. 1 represents a PCMCIA reader for connection to a personal computer, a notebook computer, etc., (i.e., a not represented data processing system) with PCMCIA port whereby only the forward area is shown and housing parts are left out in order to show the interior of the contacting unit to illustrate the inventive design. The contacting unit 1 receives a chip card 2 according to ISO 7816 standard and the chip card is shown in its contacting position. Within the card-shaped outer housing 3, comprised of a metal casing 3a and a plastic frame 3b (see FIG. 4) as is known in the art, PCMCIA plug 4 of known design with 68 standard pins is arranged. They are connected by soldering connections 5 to a printed circuit board 6 having supported thereat non-represented electronic components and integrated circuits. A plastic member 7 is arranged on the printed circuit board 6 or a correspondingly shaped window of the printed circuit board 6. The plastic member 7 supports a switch 8 having a switch spring 9 that is shown especially in FIG. 3. The switch is connected by soldering tabs 10, which are secured within the plastic member 7, electrically and mechanically to the printed circuit board 6 whereby upwardly projecting contact springs 11 are provided that allow contacting of the contact array 12 of the inserted chip card 2.

Between the chip card 2 and the housing 3 a reinforcement plate 13 is provided at the upper side of the housing (in the drawing) which extends at least across the contacting area of the chip card 2 with the printed circuit board 6.

The contact array 12 of the chip card 2 is electrically and mechanically connected by the contact springs 11 and the soldered tabs 10 to the printed circuit board 6. For ensuring the correct contacting position of the chip card 2 with its contact array 12 at the contact springs 11, the switch 8 with switch spring 9 is provided within the plastic member 7 and includes a stop 14 that delimits the axial insertion movement (arrow) of the chip card 2 into the contacting unit.

An additional guide member 15 in the form of a flat member 17 projecting across the leading transverse edge 16 of the inserted chip card 2 is provided that extends parallel at a spacing to the plastic member 7 above the axial stop 14 and is provided as a unitary part of the plastic member 7. The side facing the chip card 2 is provided with an insertion slant 18 for cooperation with the leading transverse edge 16 of the chip card 2 when being inserted into the contact unit.

Upon insertion of the chip card 2 into the contacting unit, the leading edge 16 of the chip card 2 is engaged by the insertion slant 18 of the flat member 17 and is guided into the gap between the flat member 17 and the neighboring surface of the plastic member 7. During further advancement of the chip card 2 the switch spring 9 is suppressed and the switch 8 is actuated. The forward movement of the chip card 2 is stopped at the stop 14 by abutment of the transverse leading edge 16 of the chip card 2 at the stop 14. In this end position of the chip card 2 delimited by the axial stop 14 and the vertical securing action by the flat member 17, the contact array 12 and the contact springs 11 are exactly positioned to one another in the desired contacting position. The flat member 17 counteracts the effect of the contact springs 11 and of the switch spring 9 and acts as a holding down member for the chip card and thus provides a clamping function.

In order to be able to maintain the dimensions of the outer housing 3 in the reinforcement plate 13, a cutout 15a (see FIG. 4) is provided that matches the size of the flat member 17. The flat member 17 partially engages the cutout 15a as can be seen when comparing the representation of FIGS. 1 and 2.

The specification incorporates by reference the disclosure of German priority document 297 18 773.2 of Oct. 22, 1997.

The present invention is, of course, in no way restricted to the specific disclosure of the specification and drawings, but also encompasses any modifications within the scope of the appended claims.

What is claimed is:

1. A chip card contacting unit (1) comprising:

a housing (3);

a printed circuit board (6) mounted in said housing (3);

said printed circuit board (6) having contacts (11) for contacting electrically and mechanically a contact array (12) of a chip card (2) received in said housing (3);

a switch (8) mounted in said housing (3);

said switch (8) having a stop (14) limiting insertion of the chip card (2) into said housing (3);

a guide member (15) formed above the stop (14), said guide member (15) guiding the chip card (2) during insertion and acting on a side of the chip card (2) opposite the contact array (12) to ensure correct positioning of the contact array (12) at said contacts (11) by providing an abutment;

a plastic member (7), connected to the printed circuit board (6) wherein said contacts (11) and said switch (8) are connected to said plastic member (7), wherein said plastic member (7), said stop (14), and said guide member (15) form a monolithic part.

2. A chip card contacting unit according to claim 1, wherein said guide member (15) is a holding-down element.

3. A chip card contacting unit according to claim 1, wherein said guide member (15) is connected to said stop (14) and is a flat member (17) projecting from said stop (14) in a direction counter to an insertion direction of the chip card (2).

4. A chip card contacting unit according to claim 1, wherein said guide member (15) has an insertion slant (18) for guiding a leading edge of the chip card inserted into said contacting unit.

5. A chip card contacting unit according to claim 1, wherein said guide member (15) is an elastic spring consisting of plastic.

6. A chip card contacting unit according to claim 1, wherein said housing comprises a PCMCIA plug for connecting said chip card contacting unit to a PCMCIA chip card reader.

7. A chip card contacting unit according to claim 1, wherein said housing (3) has a cutout to at least partially accommodate said guide member (15).

8. A chip card contacting unit according to claim 7, wherein said housing (3) has a reinforcement plate (13) positioned adjacent to said guide member (15), wherein said cutout is located in said reinforcement plate (13).

* * * * *